United States Patent
Zhou et al.

(10) Patent No.: US 12,407,934 B2
(45) Date of Patent: Sep. 2, 2025

(54) IMAGE ACQUISITION SYSTEM AND METHOD, AND DISPLAY PANEL PROCESSING DEVICE

(71) Applicant: BOE Technology Group Co., Ltd., Beijing (CN)

(72) Inventors: Quanguo Zhou, Beijing (CN); Xuehui Zhu, Beijing (CN); Lirong Xu, Beijing (CN); Zhidong Wang, Beijing (CN); Hao Tang, Beijing (CN); Qing Zhang, Beijing (CN); Lijia Zhou, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/283,931

(22) PCT Filed: Jan. 4, 2023

(86) PCT No.: PCT/CN2023/070398
§ 371 (c)(1),
(2) Date: Sep. 25, 2023

(87) PCT Pub. No.: WO2023/131177
PCT Pub. Date: Jul. 13, 2023

(65) Prior Publication Data
US 2024/0163560 A1     May 16, 2024

(30) Foreign Application Priority Data
Jan. 7, 2022   (CN) .......................... 202210017415.4

(51) Int. Cl.
*H04N 23/695*   (2023.01)
*B65G 47/06*    (2006.01)
(Continued)

(52) U.S. Cl.
CPC .......... *H04N 23/695* (2023.01); *B65G 47/06* (2013.01); *B65G 49/06* (2013.01); *G01B 11/03* (2013.01);
(Continued)

(58) Field of Classification Search
CPC ....... G01B 11/03; G01B 11/14; G01B 11/026; H04N 23/60; H04N 23/695; B65G 49/06;
(Continued)

(56) References Cited

U.S. PATENT DOCUMENTS 6,542,293 B2 * 4/2003 Yahiro ................. B01L 3/5085
                                                    250/201.3
7,599,076 B2 * 10/2009 Saito ...................... H01J 37/28
                                                    356/630
(Continued)

FOREIGN PATENT DOCUMENTS

CN   101498831 A   8/2009
CN   103776831 A   5/2014
(Continued)

*Primary Examiner* — Pritham D Prabhakher
(74) *Attorney, Agent, or Firm* — WHDA, LLP (57) ABSTRACT

In the technical field of display devices, there is a problem of low efficiency in image appearance inspection during the processing process of a display panel. In view of this, provided is an image acquisition system, comprising: a control device, an object loading device and an image acquisition apparatus. The control device is used for obtaining a target value of displacement between the object loading apparatus and the image acquisition apparatus according to an image signal, generating a control command, which carries the target displacement value, and then sending the control command to at least one of the object loading device and the image acquisition apparatus; and at least one of the object loading apparatus and the image acquisition apparatus moves according to the control com-
(Continued)

mand, until the definition of the image signal received by the control device in real time is greater than a preset definition threshold value.

15 Claims, 5 Drawing Sheets

(51) Int. Cl.
*B65G 49/06* (2006.01)
*G01B 11/03* (2006.01)
*G01B 11/14* (2006.01)

(52) U.S. Cl.
CPC ...... *G01B 11/14* (2013.01); *B65G 2203/0233* (2013.01); *B65G 2203/041* (2013.01)

(58) Field of Classification Search
CPC ............ B65G 47/06; B65G 2203/0233; B65G 2203/041; G01N 21/94; G01N 21/88
USPC ...................................... 348/222.1
See application file for complete search history.

(56) References Cited

U.S. PATENT DOCUMENTS

| | | | | |
|---|---|---|---|---|
| 9,247,684 B2* | 1/2016 | Ikeda | ................. | H05K 13/0015 |
| 9,703,171 B2* | 7/2017 | Zhou | .................... | G02F 1/3511 |
| 10,334,239 B2* | 6/2019 | Yoshioka | ................. | G06T 7/75 |
| 10,955,360 B2* | 3/2021 | Lee | ............................ | G06T 5/50 |
| 10,984,524 B2* | 4/2021 | Chen | ......................... | G06T 7/74 |
| 11,037,283 B2* | 6/2021 | Jang | ........................ | G02B 26/12 |
| 11,474,438 B2* | 10/2022 | Safinowski | ............... | G03F 1/62 |
| 2001/0033414 A1* | 10/2001 | Yahiro | ................... | B01L 3/5085 |
| | | | | 250/201.3 |
| 2007/0109557 A1* | 5/2007 | Saito | ........................ | H01J 37/20 |
| | | | | 356/602 |
| 2009/0251699 A1* | 10/2009 | George | .................. | H01L 23/544 |
| | | | | 356/399 |
| 2012/0236140 A1* | 9/2012 | Hazeyama | ............. | B25J 9/1697 |
| | | | | 348/94 |
| 2012/0262626 A1* | 10/2012 | Ikeda | .................. | H05K 13/0015 |
| | | | | 348/373 |
| 2014/0301632 A1* | 10/2014 | Ikeda | ........................ | G06T 7/70 |
| | | | | 382/152 |
| 2015/0219979 A1 | 8/2015 | Zhou et al. | | |
| 2017/0039715 A1* | 2/2017 | Yoshioka | .............. | H04N 17/002 |
| 2017/0122913 A1* | 5/2017 | Riviere | ..................... | G03F 1/62 |
| 2019/0014265 A1 | 1/2019 | Yu | | |
| 2020/0064276 A1* | 2/2020 | Lee | ........................ | G06T 7/0004 |
| 2020/0184624 A1* | 6/2020 | Jang | ........................... | G01J 3/06 |
| 2021/0382396 A1* | 12/2021 | Safinowski | ............... | G03F 1/84 |

FOREIGN PATENT DOCUMENTS

| | | |
|---|---|---|
| CN | 105007425 A | 10/2015 |
| CN | 111491096 A | 8/2020 |
| CN | 112839168 A | 5/2021 |
| CN | 114354630 A | 4/2022 |

\* cited by examiner

IMAGE ACQUISITION SYSTEM AND METHOD, AND DISPLAY PANEL PROCESSING DEVICE

CROSS-REFERENCE TO RELATED APPLICATION

The present application is a national phase application under 35 U.S.C. § 371 of International Patent Application No. PCT/CN2023/070398 filed on Jan. 4, 2023, which claims priority to Chinese patent application No. 202210017415.4 filed with the China Patent Office on Jan. 7, 2022, titled "IMAGE ACQUISITION SYSTEM, IMAGE ACQUISITION METHOD AND DISPLAY PANEL PROCESSING APPARATUS", both of which are incorporated herein by reference in their entireties.

TECHNICAL FIELD

The present application relates to the technical field of display devices, and in particular to an image acquisition system, an image acquisition method and a display panel processing apparatus.

BACKGROUND

The production and preparation process of a display panel generally involves multiple appearance inspections. For example, during the packaging process of the display panel, a film may be coated on the surface of the protective glass layer of the display panel only after it is determined, through the appearance inspection, that the surface of the protective glass layer is free of dirt, foreign matter or damage. Currently, the appearance inspection is generally completed by taking photos of the processed products using an optical platform that is efficient and has less pollution on the processing environment. However, for inspected objects that are reflective and difficult to be focused on, such as a display panel, it is necessary to manually debug the apparatus repeatedly to enable the optical platform to capture a clear image of the display panel, which not only consumes a lot of labor costs, but also reduces the production efficiency of the display panel.

SUMMARY

In order to solve the above problem, embodiments of the present disclosure propose an image acquisition system, an image acquisition method and a display panel processing apparatus.

An embodiment of the present application provides an image acquisition system, including a control device, an object loading device and an image acquisition device.

the object loading device is configured to fix a target object;

the image acquisition device is configured to acquire an image signal of the target object at a preset time interval, and send the image signal to the control device in real time;

the control device is configured to obtain a target displacement value between the object loading device and the image acquisition device according to the image signal, generate a control command carrying the target displacement value, and send the control command to at least one of the object loading device and the image acquisition device;

at least one of the object loading device and the image acquisition device moves according to the control command of the control device until definition of the image signal received in real time is greater than a preset definition threshold.

In some embodiments, the control device includes a target displacement value calculation module;

the target displacement value calculation module is configured to acquire a current distance value between the object loading device and the image acquisition device, further configured to analyze the image signal to obtain a target distance value between the object loading device and the image acquisition device, and further configured to obtain the target displacement value between the object loading device and the image acquisition device based on the current distance value and the target distance value;

the target distance value is a preset distance value within a focal length threshold range of the image acquisition device, and the current distance value is calculated based on current position coordinates of the object loading device and current position coordinates of the image acquisition device.

Optionally, the object loading device includes a loading platform and a three-dimensional movement module;

the loading platform is configured to fix the target object;

the three-dimensional movement module is configured to move the loading platform in one or more directions of xyz three-axis according to a loading platform displacement distance value corresponding to the control command of the control device.

In some embodiments, the object loading device further includes a rotation module;

the rotation module is configured to rotate the loading platform according to a loading platform angular displacement value corresponding to the control command of the control device.

In some embodiments, the image acquisition device includes an optical component and a 3D motor;

the optical component is configured to acquire the image signal of the target object, and the optical component at least includes a camera, a lens and a light source;

the 3D motor is configured to control, according to the displacement value of the optical component corresponding to the control command of the control device, at least one of the camera, the lens and the light source to move in one or more directions of the xyz axis.

In some embodiments, the image acquisition system further includes a conveying device configured to convey the target object.

In some embodiments, the image acquisition system further includes a first transfer device; the object loading device is disposed on a conveyor belt of the conveying device and moves with the conveyor belt, and the image acquisition device is disposed directly above the conveyor belt;

the first transfer device is configured to transfer and place the target object onto the object loading device.

In some embodiments, the image acquisition system further includes a second transfer device; the object loading device is disposed outside the conveyor belt of the conveying device, and the image acquisition device is disposed directly above the object loading device;

the second transfer device is configured to transfer and place the target object on the conveyor belt onto the object loading device.

In some embodiments, the control device further includes an image storage module and a location storage module;

the image storage module is configured to store a target image signal that has a definition greater than a preset definition threshold;

the position storage module is configured to store a shooting distance value between the object loading device and the image acquisition device when the image acquisition device acquires the target image signal.

In some embodiments, the control device further includes a shooting displacement value calculation module and a shooting control module;

the shooting displacement value calculation module is configured to obtain the current distance value between the object loading device and the image acquisition device by analyzing the image signal, and further configured to obtain the shooting displacement value between the object loading device and the image acquisition device based on the current distance value and the shooting distance value.

the shooting control module is configured to control at least one of the object loading device and the image acquisition device to move according to the shooting displacement value, and send a shooting control command to the image acquisition device, wherein the shooting control command is used for controlling the image acquisition device to acquire a clear image signal of the target object.

In some embodiments, the control device further includes a definition determination module;

the definition determination module is configured to determine that the definition of the image signal received in real time is greater than the preset definition threshold when a preset definition condition is met;

wherein the preset definition condition means: a contrast of the image signal is within a preset contrast threshold range, a gradient of the contour edge of the image signal is within a preset contour edge gradient threshold range, an image frequency of the image signal is within a preset image frequency threshold range, and phase information of the image signal complies with preset phase information.

An embodiment of the present application further provides an image acquisition method, including:

obtaining an image signal of a target object in real time;

obtaining a target displacement value between the object loading device and the image acquisition device based on the image signal;

controlling at least one of the object loading device and the image acquisition device to move based on the target displacement value until the definition of the image signal received in real time is greater than the preset definition threshold;

wherein the object loading device is configured to fix the target object, and the image acquisition device is configured to acquire the image signal of the target object according to a preset time interval.

An embodiment of this application further provides a display panel processing apparatus including the image acquisition system described in any of the above embodiments.

An embodiment of the present application further provides a computing processing device, including:

a memory storing computer readable codes;

one or more processors, wherein when the computer readable codes are executed by the one or more processors, the computing processing device performs the image acquisition method described above.

An embodiment of the present application further provides a computer-readable medium storing computer-readable codes that, when run on a computing processing device, cause the computing processing device to execute the above image acquisition method.

DETAILED DESCRIPTION OF THE EMBODIMENTS

A clear and thorough description for technical solutions in the embodiments of the present disclosure will be given below in conjunction with the accompanying drawings in the embodiments of the present disclosure. Apparently, the described embodiments are a part of embodiments of the present disclosure, not all the embodiments. All other embodiments obtained, based on the embodiments in the present disclosure, by those skilled in the art without paying creative effort fall within the protection scope of the present disclosure.

Embodiments of the present disclosure are described below with reference to the accompanying drawings of the specification.

Figure 1:
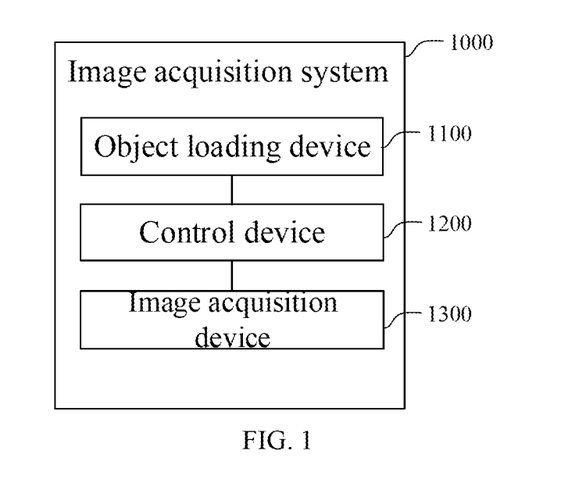
FIG. 1 is a structural block diagram of an image acquisition system provided by an embodiment of the present disclosure.

FIG. 1 is a structural block diagram of an image acquisition system 1000 provided by an embodiment of the present disclosure. As shown in FIG. 1, the image acquisition system 1000 provided by an embodiment of the present disclosure includes a control device 1200, an object loading device 1100 and an image acquisition device 1300.

The object loading device 1100 is configured to fix a target object.

The object loading device 1100 is also an object stage. The object stage in the embodiment of the present disclosure includes a loading platform 1120, preferably an automatic adjustment loading platform that can adjust the position and angle thereof. The loading platform 1120 can be controlled to move in the x/y/z direction and/or perform an angle transformation, so that the loading platform 1120 can carry the target object to any position and change the angle at which the target object is photographed. The loading platform 1120 is used to carry the target object.

The target object may be an inspected object for which the appearance inspection needs to be performed based on an image, specifically, it may be a display panel for which the appearance inspection needs to be performed based on an image.

In the embodiment of the present disclosure, the object loading device 1100 can fix the target object at a preset position on the object loading device 1100 according to a preset alignment mark on the object loading device and an alignment mark on the target object. The alignment mark on the object loading device 1100 may be a cross mark on the surface of the loading platform 1120, and the alignment mark on the target object may be a cross mark on the surface of the target object.

The image acquisition device 1300 is configured to acquire image signals of the target object at a preset time interval, and send them to the control device 1200 in real time.

The object loading device 1100 may be arranged directly below the image acquisition device 1300. After the target object to be inspected is placed and fixed on the object loading device 1100, the image acquisition device 1300 may shoot the target object.

In an optional implementation, the object loading device 1100 and the image acquisition device 1300 may also send a current position signal thereof to the control device 1200 in real time, so that the control device 1200 can know the relative position between the object loading device 1100 and the image acquisition device 1300 in real time.

In the embodiment of the present disclosure, the image acquisition device 1300 may be an optical system or an optical platform, and may include a camera 1321, a lens 1322, a light source 1323, a signal receiving module, an optical system bracket, and a 3D motor 1310. Among them, the light source 1323 and the camera 1321 may be installed on the optical system bracket. The signal receiving device is configured to receive an optical platform position adjustment signal sent from the control device 1200, to cause the camera 1321, lens 1322, light source 1323 and other components in the image acquisition device 1300 to perform a position adjustment or an angle adjustment in the x/y/z direction. The signal receiving module may be a wireless signal receiving device.

The type of components of the optical platform may be set according to the type of the object to be inspected or other needs.

The optical bracket is configured to dispose the camera 1321, the lens 1322, the signal receiving device, 3D motor 1310 and other components. The lens 1322 and the camera 1321 are configured to capture images of the target object, that is, to obtain image signals of the target object. The signal receiving module is configured to receive the optical platform position adjustment signal sent by the control device 1200, so as to ensure the incident light from the light source 1323 to be reflected to the camera 1321 to generate a clear image.

The control device 1200 is configured to: obtain a target displacement value between the object loading device 1100 and the image acquisition device 1300 according to the image signal, and control at least one of the object loading device 1100 and the image acquisition device 1300 to move according to the target displacement value until the definition of the image signal received in real time is greater than a preset definition threshold.

The target displacement value may be set according to a preset adjustment step value, and the target displacement value may include a target displacement distance value and a target angular displacement value. For example, the target displacement distance step value may be (0, 2 mm, 0), and the target angular displacement step value may be a clockwise rotation of 0.5°.

The target displacement value may be adjusted by the object loading device 1100, or the image acquisition device 1300, or a combination of the object loading device 1100 and the image acquisition device 1300.

Figure 2:
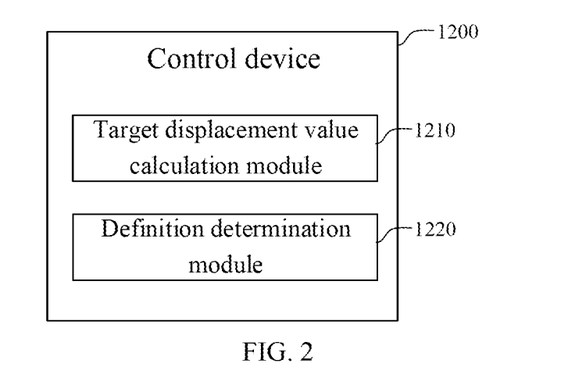
FIG. 2 is a structural block diagram of a control device provided by an embodiment of the present disclosure.

FIG. 2 is a structural block diagram of a control device 1200 provided by an embodiment of the present disclosure. As shown in FIG. 2, specifically, the definition of the image may be determined based on at least one of a contrast of the image, a gradient of the contour edge, an image frequency, and phase information. Therefore, in an optional implementation, the present application further provides a control device 1200. The control device 1200 further includes a definition determination module 1220.

The definition determination module 1220 is configured to determine that the definition of the image signal received in real time is greater than the preset definition threshold when a preset definition condition is met.

The preset definition condition means: the contrast of the image signal is within a preset contrast threshold range, the gradient of the contour edge of the image signal is within a preset contour edge gradient threshold range, the image frequency of the image signal is within a preset image frequency threshold range, and the phase information of the image signal complies with preset phase information.

Further, the definition determination module 1220 may use a central processing unit (CPU) chip or a micro-controller unit (MCU) chip as an information processing device. A program for determining the definition of the image signal may be burned into the chip, enabling the definition determination module 1220 to implement the functions of the embodiments of the present disclosure, and existing technologies may be used to implement these functions.

In the embodiment of the present disclosure, the control device 1200 may be a wireless control system. Specifically, the control device 1200 may be a distributed wireless control system, including: wireless control subsystems that are respectively provided on the object loading device 1100 and the image acquisition device 1300, and configured to control the movement and adjustment of the object loading device 1100 and the image acquisition device 1300 respectively; and a central control system that is separately provided, and configured to perform a centralized scheduling control.

According to the above embodiment of the present disclosure, in order to meet the image inspection requirements of processed products that are easily reflective and difficult to be focused on, such as display panels, the angle, height and other parameters of the object loading device 1100 and the image acquisition device 1300 may be automatically adjusted according to the image signals transmitted in real time by the image acquisition device 1300, so that the image acquisition device 1300 for capturing images can quickly acquire clear image signals of the surface of the target object. Therefore, the time for engineers to adjust devices can be effectively saved or reduced, and the device utilization rate and the image inspection efficiency are improved, thereby improving the production efficiency of products such as display panels.

The embodiments of the present disclosure may be applied to the image appearance detection of the target object. Therefore, in an optional implementation, the present disclosure further provides an image inspection device that can perform an appearance inspection on the target object in a clear image signal by obtaining an image signal, the definition of which is greater than a preset definition threshold, from the control device 1200.

Of course, in an optional implementation, the image acquisition system 1000 may also include a display device. After obtaining an image signal with a definition greater than the preset definition threshold, the control device 1200 can also send the image signal with a definition greater than the preset definition threshold to the display device, and the display device can display the target object in the clear image signal, so that the appearance inspection of the target object may be manually conducted.

As shown in FIG. 2, in an optional implementation, the present disclosure also provides a control device 1200, including a target displacement value calculation module 1210.

The target displacement value calculation module 1210 is configured to acquire a current distance value between the object loading device 1100 and the image acquisition device 1300, further configured to analyze the image signal to acquire a target distance value between the object loading device 1100 and the image acquisition device 1300, and further configured to obtain the target displacement value between the object loading device 1100 and the image acquisition device 1300 based on the current distance value and the target distance value.

The target distance value is a preset distance value within a focal length threshold range of the image acquisition device 1300, and the current distance value is calculated based on the current position coordinates of the object loading device 1100 and the current position coordinates of the image acquisition device 1300.

The current distance value, the target distance value and the target displacement value can be represented by three-dimensional coordinate values and/or angular coordinate values.

Further, the target displacement value calculation module 1210 may use a central processing unit (CPU) chip or a micro-controller unit (MCU) chip as an information processing device. A program for calculating the target displacement value may be burned into the chip, enabling the target displacement value calculation module 1210 to implement the functions of the embodiments of the present disclosure, and existing technologies may be used to implement these functions.

In the embodiment of the present disclosure, the target distance value may be set, based on the focal length threshold range of the image acquisition device 1300, according to the preset step displacement value, and the preset step displacement value may include a preset step distance value and a preset step angular displacement value. For example, the preset step distance value may be 2 mm, if the current distance value is (x1, y1, z1), then the target distance value may be (x1, y1, z1 2 mm), and the target distance value is within the focal length threshold range of the image acquisition device 1300.

Further, the target displacement value may be the difference between the target distance value and the current distance value. Exemplarily, the current distance value between the object loading device 1100 and the image acquisition device 1300 is (x1, y1, z1), and the target distance between the object loading device 1100 and the image acquisition device 1300 is (x2, y2, z2), then the target displacement value to be moved is (x0, y0, z0), where, x0=x2-x1, y0=y2-y1, z0=z2-z1.

Figure 3:
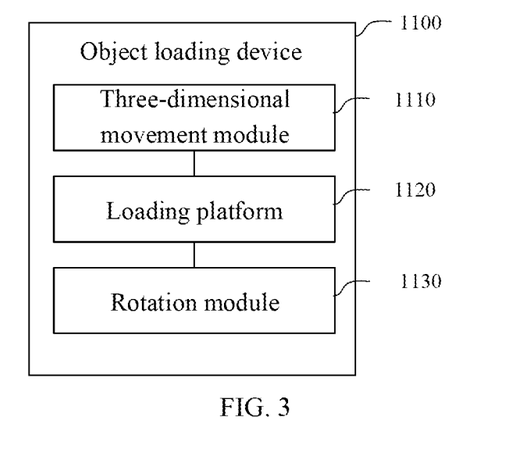
FIG. 3 is a structural block diagram of an object loading device provided by an embodiment of the present disclosure.

FIG. 3 is a structural block diagram of an object loading device 1100 provided by an embodiment of the present disclosure. As shown in FIG. 3, in the present application, a module configured to adjust the position of the loading platform 1120 can be used to adjust the position of the target object on the object loading device 1100. Therefore, in an optional implementation, the present disclosure further provides an object loading device 1100, including a loading platform 1120 and a three-dimensional movement module 1110.

The loading platform 1120 is configured to fix the target object.

Specifically, the loading platform 1120 may be a transparent loading platform 1120, and a transparent scraping-resistant conductive film may be provided on the surface of the transparent loading platform 1120 through electroplating. Therefore, the transparent loading platform 1120 can use the electrostatic adsorption principle to adsorb and fix the 3D protective glass of the display panel on the automatic adjustment loading platform.

The three-dimensional movement module 1110 is configured to move the loading platform 1120 in one or more directions of the xyz three-axis according to the displacement distance value of the loading platform 1120 corresponding to the control command of the control device 1200.

Preferably, the three-dimensional movement module 1110 may be a three-dimensional position movement device. The three-dimensional position movement device is configured to move the loading platform 1120 in one or more directions in the xyz three-axis, so that the three-dimensional movement module 1110 can realize the functions of the embodiments of the present disclosure, and the existing technology may be used to implement these functions.

The displacement distance value of the loading platform 1120 may be determined based on the control command generated by the control device 1200 through analysis and calculation. The sum of the displacement distance value of the loading platform 1120 and the displacement distance value of the optical component 1320 is equal to the target displacement distance value. By distributing the displacement of the loading platform 1120 and the displacement of the optical component 1320, the efficiency of equipment adjustment can be improved. As an example, the target displacement distance value indicates that it is required to control the object loading device 1100 to be 4 mm away from the image acquisition device 1300. This may be accomplished by moving the loading platform 1120 downward by a displacement of 4 mm under the control of the three-dimensional movement module 1110, or may be accomplished by moving the loading platform 1120 downward by a displacement of 2 mm and moving the optical component 1320 upward by a displacement of 2 mm under the control of the three-dimensional movement module 1110.

In the present application, a module configured to adjust the angle of the loading platform 1120 may also be considered to adjust the angle of the target object on the object loading device 1100. Therefore, in an optional implementation, the present application further provides an object loading device 1100 that further includes a rotation module 1130.

The rotation module 1130 is configured to rotate the loading platform 1120 according to an angular displacement value of the loading platform 1120 corresponding to the control command of the control device 1200.

Specifically, the rotation module 1130 may include a rotation shaft and a rotation driving unit. The rotation shaft, driven by the rotation driving unit, may drive the loading platform to rotate around the rotation shaft for an angle corresponding to the control command.

Furthermore, the object loading device 1100 may also include a loading platform bracket configured to dispose the loading platform 1120 and the three-dimensional movement module 1110.

The angular displacement value of the loading platform 1120 may be determined based on the control command generated by the control device 1200 through analysis and calculation. The sum of the angular displacement value of the loading platform 1120 and the angular displacement value of the optical component 1320 is equal to the target angular displacement value. For example, the target displacement value indicates that it is required to control the object loading device 1100 to rotate 1° clockwise relative to the image acquisition device 1300. This can be accomplished by rotating the loading platform 1120 for 1° in the clockwise direction under the control of the rotation module 1130, or can be accomplished by rotating the loading platform 1120 for 0.5° in the clockwise direction and rotating the optical component 1320 for 0.5° in the counterclockwise direction under the control of the rotation module 1130.

According to the above embodiments, the automatic adjustment loading platform in this application can use the three-dimensional movement module 1110 and the rotation module 1130 to adjust, according to the control command, the position and angle of the loading platform 1120 and the target object on the loading platform 1120 respectively.

Figure 4:
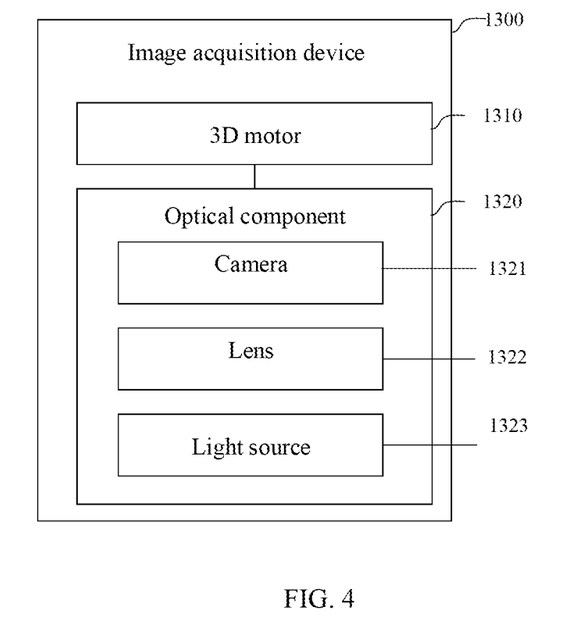
FIG. 4 is a structural block diagram of an image acquisition device provided by an embodiment of the present disclosure.

FIG. 4 is a structural block diagram of an image acquisition device 1300 provided by an embodiment of the present disclosure. As shown in FIG. 4, a 3D motor 1310 is also used in the application to complete the position adjustment of the image acquisition device 1300. In an optional implementation, this application further provides an image acquisition device 1300, including an optical component 1320 and a 3D motor 1310.

The optical component 1320 is configured to acquire the image signal of the target object, and the optical component 1320 at least includes a camera 1321, a lens 1322 and a light source 1323.

The 3D motor 1310 is configured to control, according to the displacement value of the optical component 1320 corresponding to the control command of the control device 1200, at least one of the camera 1321, the lens 1322 and the light source 1323 to move in one or more directions of the xyz axis.

Further, the 3D motor 1310 may also be configured to achieve angular rotation of the optical component 1320.

The 3D motor 1310 is configured to: in response to the optical platform position adjustment signal, drive any component among the camera 1321, the lens 1322, and the light source 1323 to move in the x/y/z direction according to the displacement value of the optical component 1320 corresponding to the optical platform position adjustment signal, so that the light emitted by the light source 1323 is ultimately reflected by the inspected display panel and then incident on the camera 1321 to generate a clear image.

Specifically, the camera 1321 may be one of an area scan camera 1321, a line scan camera 1321, a 3D camera 1321, or a smart camera 1321. The image sensor in the camera 1321 may be one of CMOS and CCD. The lens 1322 may be selected according to the focal length, and include one of a fixed focal lens 1322 and a zoom lens 1322. The lens 1322 may also be selected according to the aperture, which may be one of a fixed aperture and variable aperture. The lens 1322 may also be selected according to the field of view, and may be one of a telephoto lens 1322, an ordinary lens 1322, or a wide-angle lens 1322. The lens 1322 may also be selected according to the usage, and may be one of a telecentric lens 1322, a microscope lens 1322, a macro lens 1322, an ultraviolet lens 1322, or an infrared lens 1322.

Figure 5:
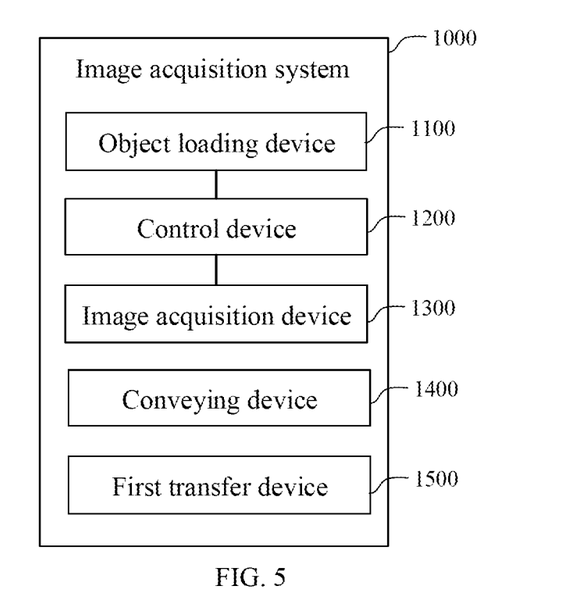
FIG. 5 is a structural block diagram of an image acquisition system provided by an embodiment of the present disclosure.

FIG. 5 is a structural block diagram of an image acquisition system 1000 provided by an embodiment of the present disclosure. As shown in FIG. 5, considering that the image acquisition system 1000 is actually used in processing scenarios, in an optional implementation, the present application further provides an image acquisition system 1000 including a conveying device 1400. The conveying device 1400 is configured to convey the target object.

Considering the convenience and production efficiency, in the present application, the target object may be shoot when the target object is directly transported on the conveying device 1400. Therefore, as shown in FIG. 5, in an optional implementation, the present application further provides an image acquisition system 1000 including a first transfer device 1500.

The first transfer device 1500 may be a mechanical arm for grabbing through vacuum suction.

The object loading device 1100 is disposed on the conveyor belt of the conveying device 1400 and moves with the conveyor belt, and the image acquisition device 1300 is disposed directly above the conveyor belt.

The first transfer device 1500 is configured to transfer and place the target object onto the object loading device 1100.

In the embodiment of the present disclosure, in order to improve the image acquisition efficiency and thereby improve the production efficiency, multiple object loading devices 1100 may be arranged on the conveyor belt of the conveying device 1400 at equal intervals.

Specifically, in the embodiment of the present disclosure, a hovering time interval of the conveyor belt may be set in advance; the target object is transferred and placed onto the object loading device 1100 by the first transfer device 1500; the conveyor belt is controlled to transport for a preset length within the preset hovering time interval, so that through pre-alignment, the object loading device 1100 on the conveying device 1400 hovers just below the image acquisition device 1300. During the hovering period, the positions and angles of the object loading device 1100 and the image acquisition device 1300 are controlled and adjusted by the control device 1200 to obtain clear image signals.

Figure 6:
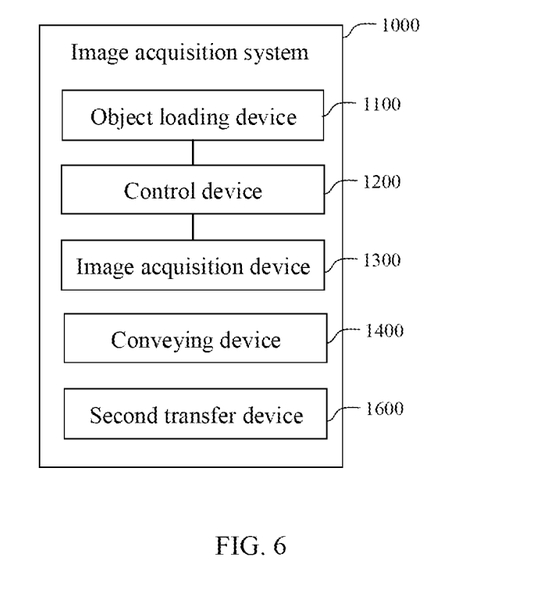
FIG. 6 is a structural block diagram of another image acquisition system provided by an embodiment of the present disclosure.

FIG. 6 is a structural block diagram of an image acquisition system 1000 provided by yet another embodiment of the present disclosure. As shown in FIG. 6, the above embodiment can use multiple object loading devices 1100 to complete image acquisition during the conveyance process. Taking into account the cost of the object loading devices 1100 and the production efficiency, the target object can be shoot after the conveying device 1400 completes the conveyance. Therefore, in an optional implementation, the present application further provides an image acquisition system 1000 including a second transfer device 1600, where the object loading device 1100 is disposed outside the conveyor belt of the conveying device 1400, and the image acquisition device 1300 is disposed directly above the object loading device 1100.

The second transfer device 1600 is configured to transfer and place the target object on the conveyor belt onto the object loading device 1100.

The second transfer device 1600 may be a mechanical arm for grabbing through vacuum suction.

Specifically, in the embodiment of the present disclosure, the hovering time interval of the conveyor belt may be set in advance, and the conveyor belt is controlled to move for a preset length within the preset hovering time interval. During the hovering period of the conveyor belt, the target object is transferred and placed onto the object loading device 1100 by the second transfer device 1600, and the positions and angles of the object loading device 1100 and the image acquisition device 1300 are controlled and adjusted by the control device 1200 to acquire clear image signals.

Considering that target objects such as display panels that have high requirement for cleanliness and are relatively smooth are prone to slipping, shaking, and wear during the conveyance process, in order to reduce dust particles generated by the conveying system during the conveyance process and reduce contamination on products, in an optional implementation, the application further provides a conveying device 1400 including a conveyor belt made of metal.

Specifically, the conveyor belt may be a metal chain belt. The conveying device 1400 may also include at least one group of rollers, the conveyor belt forms a closed loop around the rollers, and the group of rollers may drive the conveyor belt for transmission. For example, the conveying device 1400 may also be equipped with a mechanical port of the loading platform 1120 on the chain, a data port for receiving control commands, a motor that drives the rollers to rotate, and a guide rail groove. The conveying device 1400 is driven by two motors to rotate the rollers at a preset frequency, and the rollers drive the chains to rotate around the rollers.

Furthermore, the conveyor belt may be made of steel or titanium alloy. Specifically, the conveyor belt may be a steel chain belt or a titanium alloy chain belt.

Figure 7:
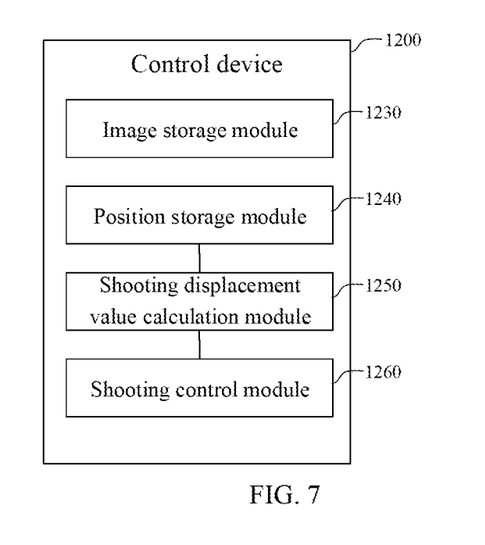
FIG. 7 is a structural block diagram of a control device provided by an embodiment of the present disclosure.

FIG. 7 is a structural block diagram of a control device 1200 provided by an embodiment of the present disclosure. As shown in FIG. 7, in the actual production process, if the optical system performance of the image acquisition device 1300 is excellent enough, a clear image can be obtained for each of the target objects of the same model and size when they are placed at the same appropriate position. Thus, it is only necessary to use the image acquisition system 1000 of the above embodiments to debug the relative position and angle of the object loading device 1100 and the image acquisition device 1300 after the model of the target object product is changed. There is no need to adjust for each target object. In this case, when the target object is a test sample, it is only necessary to store the debugged parameters of positions and angles. Therefore, in an optional implementation, the present application further provides a control device 1200 that further includes an image storage module 1230 and a position storage module 1240.

The image storage module 1230 is configured to store a target image signal that has a definition greater than a preset definition threshold.

The position storage module 1240 is configured to store a shooting distance value between the object loading device 1100 and the image acquisition device 1300 when the image acquisition device 1300 acquires the target image signal.

Further, either of the image storage module 1230 and the position storage module 1240 may use a memory, such as a read-only memory, as an information processing device. Programs for storing image signals or position information in response to storage instructions can be burned into the memory, so that the image storage module 1230 and the position storage module 1240 realize the functions of the embodiments of the present application, and existing technologies can be used to realize these functions.

The shooting distance value is a distance value between the object loading device 1100 and the image acquisition device 1300 that can be used for subsequent shooting of target objects of the same model to obtain clear image signals. The shooting distance value may include a distance value represented by three-dimensional coordinates and an angle value represented by angular coordinates.

Specifically, after the sample debugging is completed, the shooting distance value obtained in the above embodiment may be directly used as the target displacement value for subsequent products of this model. Thus, in an optional implementation, the present application further provides a control device 1200 that further includes a shooting displacement value calculation module 1250 and a shooting control module 1260.

The shooting displacement value calculation module 1250 is configured to obtain the current distance value between the object loading device 1100 and the image acquisition device 1300 by analyzing the image signal, and is also configured to obtain the shooting displacement value between the object loading device 1100 and the image acquisition device 1300 based on the current distance value and the shooting distance value.

The shooting control module 1260 is configured to control at least one of the object loading device 1100 and the image acquisition device 1300 to move according to the shooting displacement value, and send a shooting control command to the image acquisition device 1300. The shooting control command is used for controlling the image acquisition device 1300 to acquire a clear image signal of the target object.

The shooting displacement value is the parameter of the position adjustment and the parameter of the angle adjustment executed for capturing a clear image of the target object.

Specifically, the shooting displacement value may be the difference between the shooting distance value and the current distance value. Exemplarily, the current distance value between the object loading device 1100 and the image acquisition device 1300 is (x1, y1, z1), the shooting distance between the object loading device 1100 and the image acquisition device 1300 is (x3, y3, z3), then the shooting displacement value required to be moved is (x4, y4, z4), where x4=x3−x1, y4=y3−y1, z4=z3−z1.

Further, either of the shooting displacement value calculation module 1250 and the shooting control module 1260 can use a central processing unit CPU chip or a micro logic control unit MCU chip as an information processing device. Programs for calculating the shooting displacement value or controlling shooting can be burned into the chip, so that the displacement value calculation module 1250 and the shooting control module 1260 realize the functions of the embodiments of the present disclosure, and existing technologies can be used to realize these functions.

According to the above embodiments, when the product model is changed on the production line, the image acquisition system 1000 provided by the present application can adjust the distance between the object loading device 1100 and the image acquisition device 1300 in real time according to the image signals received in real time, and store the shooting distance value between the object loading device 1100 and the image acquisition device 1300, at which a clear image is captured, as a position relationship parameter.

Therefore, when a target object of the same model needs to be imaged for appearance inspection, the stored shooting distance value is directly used, combined with the current distance, to control one of the object loading device 1100 and the image acquisition device 1300 to be displaced, that is, a clear image can be directly captured, thereby further improving the image acquisition efficiency and the product production efficiency.

In conjunction with the above embodiments, for acquiring images of display panel samples that are reflective and difficult to be focused and capture a clear image, so to further realize the image appearance inspection requirements of the display panel, an embodiment of the present disclosure further provides an exemplary method for acquiring a display panel sample image on the conveying device 1400, which is applied to the image acquisition system 1000 in which the object loading device 1100 is installed on the conveying device 1400.

At step S501, a display panel sample is transported from a feeding port to the vicinity of the object loading device 1100.

At step S502, the display panel sample is transferred and hovered above the object loading device 1100 by a first transfer device 1500, where the first transfer device 1500 may be a mechanical arm with a sucking disc.

At step S503, a camera 1321 alignment system is used to capture an alignment mark on the display panel sample and an alignment mark on the object loading device 1100, and a distance value, in any direction among the three-dimensional direction, that the display panel sample needs to move is calculated.

At step S504, the display panel sample is controlled to move a corresponding distance in the corresponding direction by the first transfer device 1500, and a precise alignment is further performed by the camera 1321 alignment system on the alignment mark on the display panel sample and the alignment mark on the object loading device 1100, and the display panel sample is placed on the loading platform 1120 of the object loading device 1100 according to the precise alignment position, so that the alignment mark on the display panel sample overlaps with the alignment marks on the object loading device 1100.

At step S505, the object loading device 1100 is loaded with electrostatic charges, and the sample display panel is adsorbed on the loading platform 1120.

At step S506, through the three-dimensional movement module 1110 of the object loading device 1100, the loading platform 1120 carrying the display panel sample is controlled to move below the image acquisition device 1300, and the image acquisition system 1000 provided in the above embodiment automatically acquires an image signal with a definition greater than the preset definition threshold.

At step S507, the image signal with a definition greater than the preset definition threshold is stored, and the shooting distance value between the object loading device 1100 and the image acquisition device 1300 when the image acquisition device 1300 acquires the clear image signal is stored. The shooting distance value represents the distance parameter and angle parameter of the loading platform 1120 and the optical shooting system.

Furthermore, also for realizing the image appearance detection requirements of the display panel, it is applied to the image acquisition system 1000 in which the object loading device 1100 is disposed on a side of the conveying device 1400, an embodiment of the present application further provides an exemplary method for acquiring sample images on an independent object loading device 1100:

At step S601, the display panel sample is transported from the feeding port to the vicinity of the object loading device 1100 through the conveying device 1400.

At step S602, the display panel sample is transferred and hovered from the conveying device 1400 to the object loading device 1100 by the second transfer device 1600, wherein, the second transfer device 1600 may be a mechanical arm with a sucking disc.

At step S603, the camera 1321 alignment system is used to capture an alignment mark on the display panel sample and an alignment mark on the object loading device 1100, and a distance value, in any direction among the three-dimensional direction, that the display panel sample needs to move is calculated.

At step S604, the display panel sample is controlled to move a corresponding distance in the corresponding direction by the second transfer device 1600, and a precise alignment is further performed by the camera 1321 alignment system on the alignment mark on the display panel sample and the alignment mark on the object loading device 1100, and the display panel sample is placed on the loading platform 1120 of the object loading device 1100 according to the precise alignment position, so that the alignment mark on the display panel sample overlaps with the alignment marks on the object loading device 1100.

At step S605, the object loading device 1100 is loaded with electrostatic charges, and the sample display panel is adsorbed on the loading platform 1120.

At step S606, through the three-dimensional movement module 1110 of the object loading device 1100, the loading platform 1120 carrying the display panel sample is controlled to move below the image acquisition device 1300, and the image acquisition system 1000 provided in the above embodiment automatically acquires an image signal with a definition greater than the preset definition threshold.

At step S607, the image signal that has a definition greater than the preset definition threshold is stored, and the shooting distance value between the object loading device 1100 and the image acquisition device 1300 when the image acquisition device 1300 acquires the clear image signal is stored. The shooting distance value represents the distance parameter and angle parameter of the loading platform 1120 and the optical shooting system.

According to the above embodiments, in the example methods provided in the present application, for the image acquisition system 1000 in which the object loading device 1100 is fixed on the conveyor belt of the conveying device 1400 and moves along with the conveyor belt, and for the image acquisition system 1000 in which the object loading device 1100 is provided on a side of the conveying device 1400 and does not move along with the conveyor belt, solutions for acquiring a clear image signal of the display panel sample are provided. Therefore, after the display panel model is changed, it is possible to automatically adjust the distance between the object loading device 1100 and the image acquisition device 1300, and the sample appearance image and shooting position parameters are acquired and stored or the image appearance inspection of the display panel, thereby greatly improving the efficiency of the display panel appearance inspection and further improving the automation and production efficiency of producing and preparing display panels.

Figure 8:
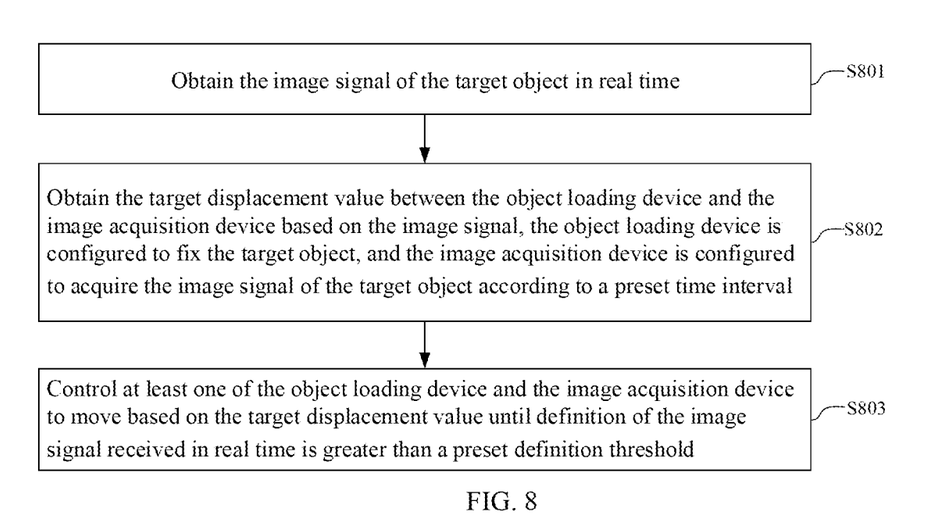
FIG. 8 is a flow chart of an image acquisition method provided by an embodiment of the present disclosure.

FIG. 8 is a flow chart of an image acquisition method provided by an embodiment of the present disclosure. Based on the same creative concept, an embodiment of the present application further provides an image acquisition method that can be applied to the control device 1200 in the image acquisition system. As shown in FIG. 8, the image acquisition method includes:

- at step S801, obtaining the image signal of the target object in real time;
- at step S802, obtaining the target displacement value between the object loading device 1100 and the image acquisition device 1300 based on the image signal;
- at step S803, controlling at least one of the object loading device 1100 and the image acquisition device 1300 to move based on the target displacement value until the definition of the image signal received in real time is greater than the preset definition threshold;
- wherein the object loading device 1100 is configured to fix the target object, and the image acquisition device 1300 is configured to acquire the image signal of the target object according to a preset time interval.

Based on the same creative concept, an embodiment of the present disclosure further provides a display panel processing apparatus, including the image acquisition system 1000 described in any of the above embodiments.

Various embodiments in the specification are described in a progressive manner, each embodiment focuses on the difference from other embodiments, and the same and similar parts of various embodiments can be referred to each other.

Various component embodiments of the present application may be implemented in hardware, or in software modules running on one or more processors, or in a combination thereof. Those skilled in the art should understand that a microprocessor or a digital signal processor (DSP) may be used in practice to implement some or all functions of some or all components in the computing processing device according to embodiments of the present application. The present application may also be implemented as an apparatus or device program (e.g., computer program and computer program product) for performing part or all of the methods described herein. Such a program implementing the present application may be stored on a computer-readable medium, or may be in the form of one or more signals. Such signals may be downloaded from an Internet website, or provided on a carrier signal, or in any other form.

Figure 9:
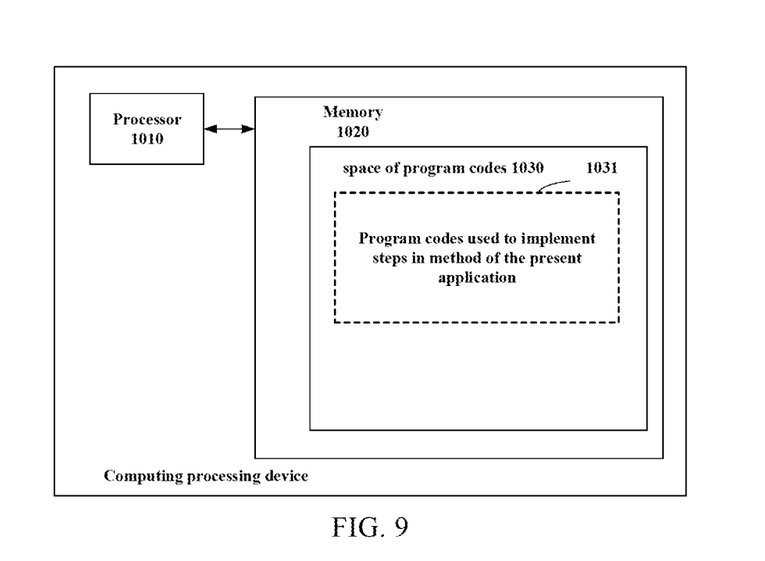
FIG. 9 is a block diagram schematically illustrating a computing processing device for executing methods according to the present disclosure.
Figure 10:
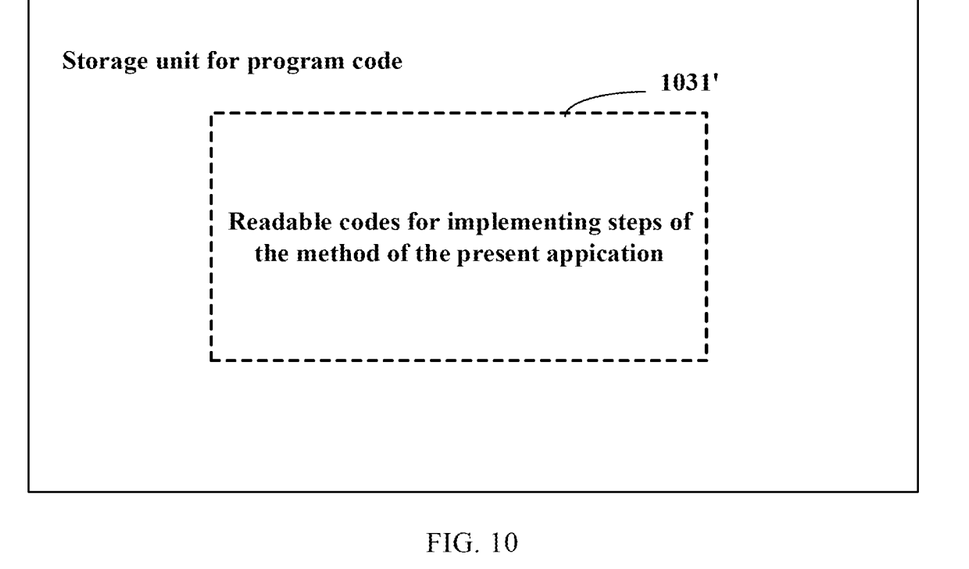
FIG. 10 schematically illustrates a storage unit holding or carrying program codes for implementing methods according to the present disclosure.

For example, FIG. 9 shows a computing processing device that can implement methods according to the present application. The computing processing device conventionally includes a processor 1010 and a computer program product or computer-readable medium in the form of memory 1020. The memory 1020 may be an electronic memory such as flash memory, EEPROM (Electrically Erasable Programmable Read Only Memory), EPROM, hard disk, or ROM. The memory 1020 has a storage space 1030 of program codes 1031 for executing any method steps in the above-mentioned methods. For example, the storage space 1030 for program codes may include individual program codes 1031 respectively used to implement various steps in the above method. These program codes can be read from one or more computer program products or written into one or more computer program products. These computer program products include program code carriers such as hard disks, compact disks (CDs), memory cards or floppy disks. Such computer program products are typically portable or fixed storage units as described with reference to FIG. 10. The storage unit may have storage segments, storage spaces, etc. arranged similarly to the memory 1020 in the computing processing device of FIG. 9. For example, the program code may be compressed in a suitable form. Typically, the storage unit includes computer readable code 1031', i.e., code that can be read by a processor such as 1010. The code, when executed by a computing processing device, causes the computing processing device to perform various steps of the methods described above.

Finally, it needs to be explained that herein, relational terms such as first and second are used merely to distinguish an entity or operation from another entity or operation, and do not necessarily require or imply the existence of any such actual relationship or sequence between these entities or operations. Furthermore, the terms "comprising", "including" or any other variation thereof are intended to cover a non-exclusive inclusion, such that a process, method, article, or apparatus including a list of elements includes not only those elements but also other elements not expressly listed, or elements inherent to the process, method, article or apparatus. Without further limitations, an element defined by the phrase "comprising a . . . " does not exclude the presence of additional identical elements in the process, method, article or apparatus including said element.

An image acquisition system, method and a display panel processing apparatus provided by the present disclosure has been introduced in detail above. Specific examples are used to illustrate the principles and implementation methods of the present disclosure here. The description of the above embodiments is only used to help understand the method and the core idea of the present application. Moreover, for those skilled in the art, there will be changes in the specific implementation and application scope based on the ideas of the present application. In summary, the content of this description should not be understood as a limitation of the present application.

Other embodiments of the present disclosure will be readily apparent to those skilled in the art from consideration of the specification and practice of the application disclosed herein. This application is intended to cover any variations, uses, or adaptations of the application that follow the general principles of this application and include common knowledge or customary technical means in the technical field that are not disclosed in this application. The specification and examples be considered as exemplary only, and a true scope and spirit of the application is indicated by the following claims.

It is to be understood that the present disclosure is not limited to precise structures described above and illustrated in the accompanying drawings, and that various modifications and changes may be made without departing from the scope thereof. The scope of the application is limited only by the appended claims.

References herein to "one embodiment," "an embodiment," or "one or more embodiments" mean that a particular feature, structure, or characteristic described in connection with the embodiments is included in at least one embodiment of the present disclosure. Additionally, please note that wordings such as "in one embodiment" herein do not necessarily all refer to the same embodiment.

In the specification provided herein, numerous specific details are set forth. However, it is understood that embodiments of the present disclosure may be practiced without these specific details. In some instances, common methods, structures and techniques have not been shown in detail in order not to obscure the understanding of this description.

In the claims, any reference signs placed between parentheses shall not be construed as limiting the claim. The word "comprising/including" does not exclude the presence of elements or steps not listed in the claim. The word "a" or "an" preceding an element does not exclude the presence of a plurality of such elements. The disclosure may be implemented by means of hardware including several distinct elements and a suitably programmed computer. In a unit claim enumerating several devices, several of these devices may be embodied by the same hardware item. The words such as "first", "second", and "third" as used do not indicate any order. These words may be interpreted as names.

Finally, it should be noted that the above embodiments are only used to illustrate the technical solutions of the present disclosure, rather than limiting them. Although the present disclosure has been described in detail with reference to the foregoing embodiments, those skilled in the art should understand that, the technical solutions described in the foregoing embodiments can still be modified, or equivalent replacements for some of the technical features may be performed; and these modification or replacement do not make the essence of the corresponding technical solutions deviate from the spirit and scope of the technical solutions of the embodiments of the present disclosure.

The invention claimed is:

1. An image acquisition system, comprising a control device, an object loading device and an image acquisition device;
   the object loading device is configured to fix a target object;
   the image acquisition device is configured to acquire an image signal of the target object at a preset time interval, and send the image signal to the control device in real time;
   the control device is configured to obtain a target displacement value between the object loading device and the image acquisition device according to the image signal, generate a control command carrying the target displacement value, and send the control command to at least one of the object loading device and the image acquisition device;
   at least one of the object loading device and the image acquisition device moves according to the control command of the control device until definition of the image signal received in real time is greater than a preset definition threshold.

2. The image acquisition system according to claim 1, wherein the control device comprises a target displacement value calculation module;
   wherein the target displacement value calculation module is configured to acquire a current distance value between the object loading device and the image acquisition device, further configured to analyze the image signal to obtain a target distance value between the object loading device and the image acquisition device, and further configured to obtain the target displacement value between the object loading device and the image acquisition device based on the current distance value and the target distance value;
   wherein the target distance value is a preset distance value within a focal length threshold range of the image acquisition device, and the current distance value is calculated based on current position coordinates of the object loading device and current position coordinates of the image acquisition device.

3. The image acquisition system according to claim 1, wherein the object loading device comprises a loading platform and a three-dimensional movement module;
   the loading platform is configured to fix the target object;
   the three-dimensional movement module is configured to move the loading platform in one or more directions of xyz three-axis according to a loading platform displacement distance value corresponding to the control command of the control device.

4. The image acquisition system according to claim 3, wherein the object loading device further comprises a rotation module;
   wherein the rotation module is configured to rotate the loading platform according to a loading platform angular displacement value corresponding to the control command of the control device.

5. The image acquisition system according to claim 1, wherein the image acquisition device comprises an optical component and a 3D motor;
   the optical component is configured to acquire the image signal of the target object, and the optical component at least comprises a camera, a lens and a light source;
   the 3D motor is configured to control, according to an optical component displacement value corresponding to the control command of the control device, at least one of the camera, the lens and the light source to move in one or more directions of the xyz axis.

6. The image acquisition system according to claim 1, further comprising a conveying device;
   the conveying device is configured to convey the target object.

7. The image acquisition system according to claim 6, further comprising a first transfer device;
   the object loading device is disposed on a conveyor belt of the conveying device and moves along with the conveyor belt, and the image acquisition device is disposed directly above the conveyor belt;
   the first transfer device is configured to transfer and place the target object onto the object loading device.

8. The image acquisition system according to claim 6, further comprising a second transfer device; the object loading device is disposed outside the conveyor belt of the conveying device, and the image acquisition device is disposed directly above the object loading device;
   the second transfer device is configured to transfer and place the target object on the conveyor belt onto the object loading device.

9. The image acquisition system according to claim 1, wherein the control device further comprises an image storage module and a position storage module;
   the image storage module is configured to store a target image signal with a definition greater than the preset definition threshold;
   the position storage module is configured to store a shooting distance value between the object loading device and the image acquisition device when the target image signal is acquired by the image acquisition device.

10. The image acquisition system according to claim 9, wherein the control device further comprises a shooting displacement value calculation module and a shooting control module;
    the shooting displacement value calculation module is configured to obtain the current distance value between the object loading device and the image acquisition device by analyzing the image signal, and further configured to obtain the shooting displacement value between the object loading device and the image acquisition device based on the current distance value and the shooting distance value;
    the shooting control module is configured to control at least one of the object loading device and the image acquisition device to move according to the shooting displacement value, and send a shooting control command to the image acquisition device, wherein the shooting control command is used for controlling the image acquisition device to acquire a clear image signal of the target object.

11. The image acquisition system according to claim 1, wherein the control device further comprises a definition determination module;

the definition determination module is configured to determine that the definition of the image signal received in real time is greater than the preset definition threshold when a preset definition condition is met;

wherein the preset definition condition means: a contrast of the image signal is within a preset contrast threshold range, a gradient of a contour edge of the image signal is within a preset contour edge gradient threshold range, an image frequency of the image signal is within a preset image frequency threshold range, and phase information of the image signal complies with preset phase information.

12. An image acquisition method, comprising:
obtaining an image signal of a target object in real time;
obtaining a target displacement value between an object loading device and an image acquisition device based on the image signal;
controlling at least one of the object loading device and the image acquisition device to move based on the target displacement value until definition of the image signal received in real time is greater than a preset definition threshold;
wherein the object loading device is configured to fix the target object, and the image acquisition device is configured to acquire the image signal of the target object according to a preset time interval.

13. A computing processing device, comprising:
a memory storing computer readable codes;
one or more processors, wherein when the computer readable codes are executed by the one or more processors, the computing processing device performs the image acquisition method according to claim 12.

14. A non-transient computer-readable medium storing computer-readable codes that, when run on a computing processing device, cause the computing processing device to perform the image acquisition method according to claim 12.

15. A display panel processing apparatus, comprising an image acquisition system, wherein the image acquisition system comprises a control device, an object loading device and an image acquisition device;
the object loading device is configured to fix a target object;
the image acquisition device is configured to acquire an image signal of the target object at a preset time interval, and send the image signal to the control device in real time;
the control device is configured to obtain a target displacement value between the object loading device and the image acquisition device according to the image signal, generate a control command carrying the target displacement value, and send the control command to at least one of the object loading device and the image acquisition device;
at least one of the object loading device and the image acquisition device moves according to the control command of the control device until definition of the image signal received in real time is greater than a preset definition threshold.

* * * * *